Nov. 8, 1966

U. BUZZI 3,284,583

PERMUTATION SWITCH WITH MULTIPLE CONTACT RODS AND ARRESTING DEVICE

Filed Dec. 16, 1963

2 Sheets-Sheet 1

INVENTOR:
Ugo Buzzi
By Werner W. Kleeman
His Attorney

INVENTOR:
Ugo Buzzi
By Werner W. Kleeman
His Attorney

United States Patent Office 3,284,583

Patented Nov. 8, 1966

3,284,583

PERMUTATION SWITCH WITH MULTIPLE CONTACT RODS AND ARRESTING DEVICE

Ugo Buzzi, Zug, Switzerland, assignor to Anstalt Europäische Handelsgesellschaft, Vaduz, Liechtenstein, a corporation of Liechtenstein Filed Dec. 16, 1963, Ser. No. 330,935

Claims priority, application Switzerland, Dec. 21, 1962, 15,020/62

8 Claims. (Cl. 200—11)

The present invention broadly relates to an improved permutation switch and, more particularly, to switches of the type particularly employed in conjunction with coding devices or apparatus in order to establish permutation connections between a number of input conductors or lines and a number of output conductors or lines.

In the electric switch technique, such types of circuit connections are realized by crossed bus bars or crossbar distribution panels. In such case, a number of conductors or bus bars are arranged side by side in a plane, while underneath there is situated a further plane in which the bus bars thereof extend perpendicular to the bus bars of the first plane. It is thus possible to provide an electrical connection at each transposition point between the crossing bus bars of both planes by means of special connecting or coupling plugs. The same problem exists with the present invention, yet it is not possible to employ crossbar distribution panels or crossed bus bars for this purpose on account of the large space requirements.

It is, therefore, a primary object of the present invention to provide an improved permutation switch having relatively small space requirements and possessing a compact construction.

Another important object of the present invention is the provision of an improved permutation switch rendering it possible to positively connect, as desired, a given number of input lines or conductors with a given number of output lines or conductors.

The permutation switch of the present invention is generally manifested by the features that, an $n$ number of input conductors or lines extend to an $n$ number of bare conductor rods or bars which are concentrically distributed and in the axial direction are stationarily or fixedly arranged, whereas the output conductors lead to an $m$ number of contact disks arranged adjacent one another for rotation about the conductor rods and can assume at least $n$ arrested or stop positions which in each case correspond to the $n$ possible contact connections.

In accordance with an illustrative embodiment there are arranged coaxially to the conductor rods in alternating manner stationary plates provided with slide surfaces or rails and rotatable contact disks provided with sliding contacts. Each slide or contact rail is equipped with a conductor or circuit connection for an output conductor. The contact disks consisting of insulating material advantageously are provided with a contact ring formed of conductive material which carries at least one such slide contact, and a contact spring cooperating with the conductor rods. The contact disk is preferably constructed as a ring placed about the rods and is advantageously provided with an arresting or stopping device.

In similar manner it is also possible to produce a multi-pole permutation switch. The essential feature of such a switch resides in the fact that each contact disk is provided with contact segments advantageously corresponding in number to the number of poles and each such segment can be adjusted to individual conductor rods by means of a contact spring, whereas a slide contact contacts a segmental or segment-like slide rail or track of a stationary plate provided with a conductor connection. More specifically, the stationary plate carries the same number of segmental slide rails each having a conductor connection, as there are poles.

Other features, objects and advantages of the invention will become apparent by reference to the following detailed description and drawing in which.

Figure 6:
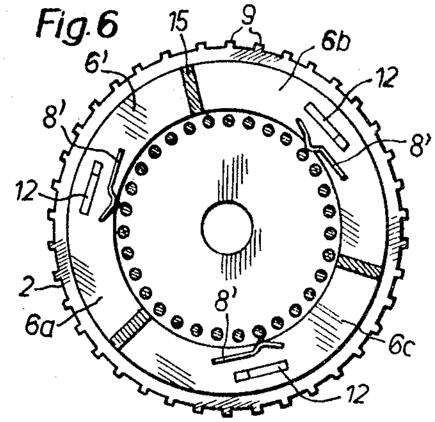
Figure 7:
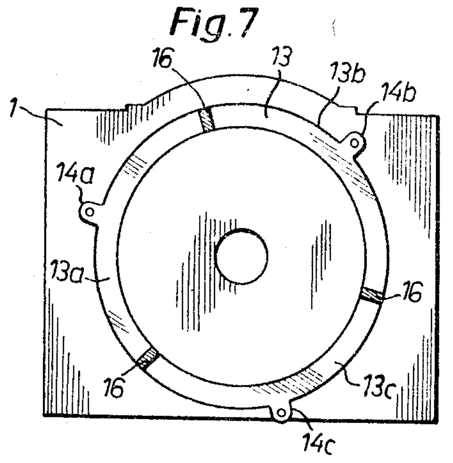
Figure 8:
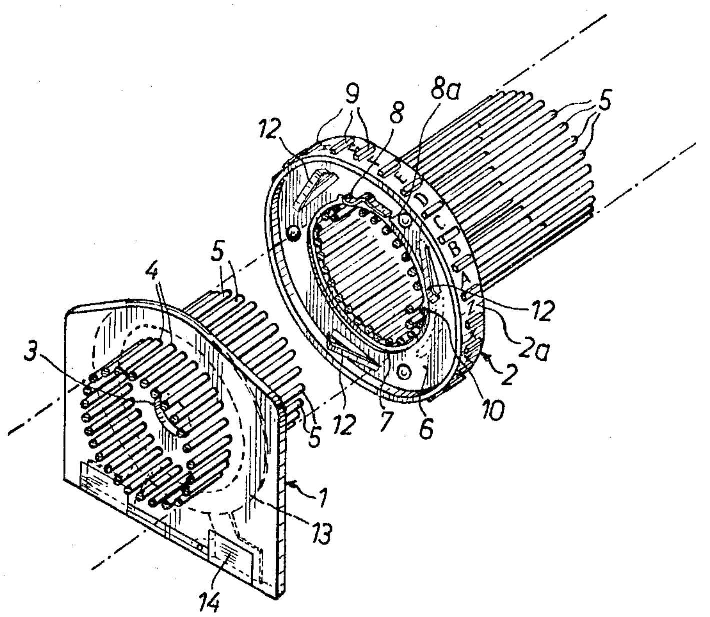

FIGURE 6 schematically shows details of a modified form of contact disk for a multi-pole permutation switch;

FIGURE 7 schematically depicts details of a modified form of stationary plate adapted to be used with the arrangement of FIGURE 6; and FIGURE 8 is an exploded perspective view of the basic components of the inventive permutation switch of FIGURES 1–5.

Directing attention now to the drawing, it should be appreciated that only a few of the elements of the permutation switch have been shown for the sake of simplicity in illustration. Each element comprises a stationary plate 1 and a rotatable contact disk 2, and it should be understood that the permutation switch can incorporate any desired number of such elements, as may be required. Each of the stationary plates 1 is provided with a central bore 3 by means of which it can be pushed onto a non-illustrated shaft member or the like. Each of the stationary plates 1 is provided with apertures or openings 4 arranged substantially concentrically with respect to the central bore 3 of geometric central axis, such openings serving to receive bare conductor rods or bars 5. The stationary plates 1 and contact disks 2 are arranged alternately one adjacent the other, that is side by side as shown.

Figure 1:
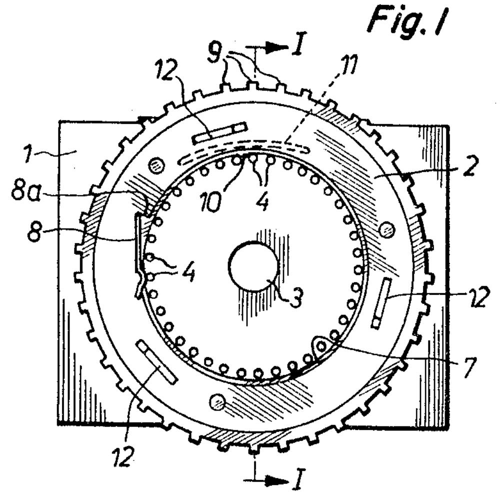
FIGURE 1 is a side view of the inventive permutation switch with removed end plate.
Figure 2:
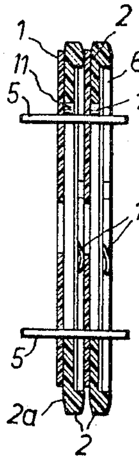
FIGURE 2 is a cross-sectional view taken along lines I—I of FIGURE 1.
Figure 3:
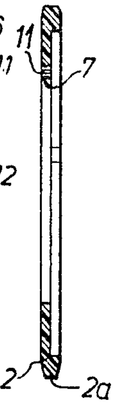
FIGURE 3 is a sectional view of a contact disk with removed contact ring.
Figure 4:
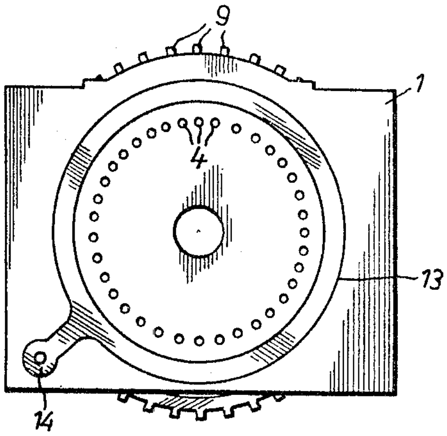
FIGURE 4 illustrates the permutation switch of FIGURE 1 as viewed from the rear.
Figure 5:
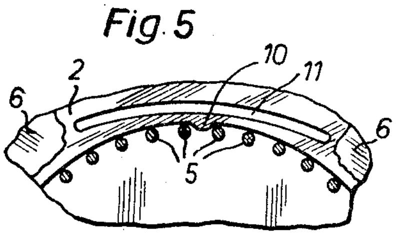
FIGURE 5 is a fragmentary, enlarged view of details of the permutation switch of FIGURE 1, with partially broken away contact ring in order to expose details of the physical structure of the arresting device.

In the present instance, the rotatable contact disks 2 each consist of a recessed ring-shaped insulating plate 2*a* in which there is embedded a contact ring 6 formed of conductive material. Each of the contact disks 2 and the contact rings 6 possess a central opening 7 and are rotatably mounted about the drum-shaped arranged conductor rods or bars 5 which provide a substantially cylindrical cage or basket. In this embodiment a contact means in the form of a contact spring 8 is mounted to, as in a recess 8*a*, or otherwise carried by each of the contact rings 6, and each such contact spring 8 is located at the inner side or margin of the associated opening 7, as best seen by referring to FIGURES 1 and 8. Such contact springs 8 can be brought from the outside into contact with the individual conductor rods or bars 5. In order to permit adjustment of each contact disk 2, serrations or teeth 9 are provided at the periphery thereof. In addition, each contact disk 2 carries a locking or arresting device, in this case in the form of a resilient lobe or nose member 10 which in its locking position is situated between two neighboring conductor rods 5, as best shown in FIGURE 5. The resiliency or elasticity of each aforesaid nose 10 is provided by the elastic material used for the contact disk 2 and a slot 11 provided in such contact disk 2.

The contact rings 6 are each provided with lateral arranged sliding contacts 12, here for example shown to be three in number, but obviously could be more or less, and which are continually in contact with slide surface or contact rail means 13 provided at the neighboring stationary plate 1. Each slide surface means 13 leads to a connection flap or piece 14 to which there is connected an outlet chamber. Hence, it is possible to provide an electrical connection from any particular incoming line to any particular outgoing line by appropriately rotating a desired contact disk 2 such that current flows from the bare conductor rod 5 in contact with the contact spring 8 of such desired contact disk 2 via the slide contacts 12 to the contact rail means 13 of the cooperating stationary plate 1, and then to the desired outlet line via connection piece 14.

Consistent with the foregoing and by virtue of the physical structure of the permutation switch set forth hereinabove, it is readily possible to provide permutation connections between $n$ incoming lines and $m$ outgoing lines, wherein the incoming lines extend to $n$ bare conductor rods 5, in the illustrated embodiment shown to be fixedly arranged in axial direction and concentrically about an axis, while the outgoing lines extend to $m$ contact disks 2 arranged adjacent one another or side by side for rotation about the aforesaid conductor rods and are each able to assume at least $n$ arrested or stop positions corresponding each to one of the $n$ possible contact connections. While generally the contact disks 2 are each able to assume at least $n$ arrested positions corresponding at least in number to the $n$ incoming lines, it is conceivable that each contact disk be limited in movement to assume less than $n$ arrested positions, if such should be desired for some reason. On the other hand, the contact disks 2 can also be modified from the embodiment shown such that they can each assume more than $n$ arrested positions. In such case, for example, it would be possible to provide two contact springs 8 on opposite faces of the contact ring 6 which are arranged offset from one another, such that only one such contact spring 8 bears against a conductor rod 5 for any arrested position of the contact disk 2. At the same time, and with such a modified embodiment, there would also be provided for example two arresting noses 10 spaced from one another such that only one nose at any one time, that is in any arrested position of the contact disk 2, lies between a pair of conductor rods. The pair of noses 10 in such a variant construction then would alternately engage in the space between a cooperating pair of conductor rods 5. It will thus be appreciated that in such a modified embodiment employing two noses 10 and two offset contact springs 8, each of the contact disks 2 could assume twice the number of arrested positions as there are incoming lines.

It will be recalled that the possibility was mentioned of constructing a permutation switch as a multi-pole permutation switch. Such a modified embodiment is disclosed in FIGURES 6 and 7 wherein like reference numerals have been generally conveniently employed to designate similar or analogous components.

It is to be assumed that the multi-pole permutation switch in this case is a three-pole switch, but obviously could be designed with a different number of poles, as should be apparent to those versed in the art. In the case of a three-pole switch, the contact disk 2 is provided with a contact ring 6' divided into three contact segments **6*a*, 6*b*, 6*c* spaced from one another by suitable insulation 15. Each such contact segment 6*a*, 6*b*, 6*c* carries a respective contact spring 8' adapted to bear against the conductor rods 5 as well as a respective slide or sliding contact 12. Hence, by appropriately rotating the contact disk 2 it is possible to bring the respective contact springs 8' into electrical conducting relation with specific desired conductor rods 5**, for reasons which should be apparent from the foregoing discussion.

The stationary plate 1, in this case, is also provided with a modified physical structure. More specifically, the slide rail means 13 is also segmental, in this case incorporating the same number of segments **13*a*, 13*b*, 13*c* as there are poles, such slide rail segments being spaced from one another by suitable insulation 16. Each slide rail segment 13*a*, 13*b*, 13*c* is provided with a corresponding connection piece or connection means 14*a*, 14*b*, 14*c***, respectively, to each of which there is connected a corresponding outlet conductor. Quite obviously, the mode of operation of this embodiment is similar to what has been previously described, however in this instance one is dealing with a multi-pole permutation switch.

While there is shown and described present preferred embodiments of the invention it is to be distinctly understood that the invention is not limited thereto but may be otherwise variously embodied and practised within the scope of the following claims.

What is claimed is:

1. A contact disk arrangement for an electrical switching device comprising a rotatable contact disk, said rotatable contact disk incorporating an insulating plate provided with an opening, at least one conductor rod piercingly extending through said opening, a conductive contact ring provided with an opening through which said at least one conductor rod likewise piercingly extends, said conductive contact ring being carried by said insulating plate, whereby both said insulating plate and said conductive contact ring encircle and are supported by said piercingly extending conductor rod.

2. A contact disk arrangement for an electrical switching device as defined in claim 1 further including at least one contact spring and one slide contact supported by said conductive contact ring.

3. In a permutation switch, particularly for coding devices, the combination comprising:
  - a plurality of elongated bare conductor rods adapted to be connected to incoming lines;
  - said rods being arranged in substantially equally spaced parallel relation with respect to one another, with all such rods being equiradially spaced with respect to an imaginary central axis;
  - said rods thereby serving to define a continuous cylindrical cage;
  - at least one stationary plate means having a plurality of apertures formed therein in a circular pattern, said rods piercingly extending through said apertures to mount said plate means upon said cage with a portion of said plate means extending beyond and at least partially surrounding said cage;
  - said plate means portion including an electrically conductive portion adapted to be connected to at least one outgoing line; and,
  - annular disk means for each stationary plate means, said annular disk means having a circular inner periphery which surrounds and abuts against the exterior of said cylindrical cage whereupon said cage supports said disk means;
  - said annular disk means also having an outer periphery which can be digitally engaged to rotate said disk means relatively to said cage;
  - said annular disk means including an electrically conductive means spaced inwardly from said outer periphery and directed toward said electrically conductive portion;
  - said electrically conductive means including at least one contact means in engagement with said electrically conductive portion to thereby electrically couple said conductive means and said conductive portion together;
  - said electrically conductive means also including a connection means at least partially located along said inner periphery to selectively abut against a particular single one of said rods;
  - said disk means being rotatable through substantially a complete 360° rotation about said cylindrical cage, with such rotation being digitally effected by movement of said disk means outer periphery;
  - said disk means thereby having a plurality of different operating positions corresponding in number to the number of said rods;
  - each of said operating positions having said connection means in contact with a selected one of said rods to thereby electrically couple the incoming line associated with that rod to an outgoing line connected with said electrically conductive portion.

4. The combination defined in claim 3 wherein said inner periphery includes at least one non-conductive projection acting as a detent which fits into the space between an adjacent pair of said rods while said electrically conductive connection means is in abutting contact with another rod in said cage.

5. The combination defined in claim 3 including a plurality of said stationary plate means and a like plurality of separately rotatable annular disk means.

6. The combination defined in claim 3 for a multi-pole permutation switch, wherein said electrically conductive means includes a plurality of segments separated from one another by insulation means, the number of said segments being equal to the number of poles of said switch, one of said connection means and one of said contact means being provided for each of said segments.

7. The combination defined in claim 6 wherein said conductive portion includes a plurality of segments separated from one another by insulation means, the number of said segments being equal to the number of poles of said switch, with each segment of said conductive portion being adapted to be connected to a separate outgoing line.

8. The combination defined in claim 7 including a plurality of said stationary plate means and a like plurality of separately rotatable annular disk means.

References Cited by the Examiner

UNITED STATES PATENTS

| | | | |
|---|---|---|---|
| 611,724 | 10/1898 | Weston | 200—153 X |
| 3,089,923 | 5/1963 | Wright. | |
| 3,102,939 | 9/1963 | Bauer | 200—166 |
| 3,132,216 | 5/1964 | Adams | 200—11 |
| 3,164,689 | 1/1965 | Pensis | 200—11 |

ROBERT K. SCHAEFER, *Primary Examiner.*

KATHLEEN H. CLAFFY, ROBERT K. SCHAEFER, *Examiners.*

J. R. SCOTT, *Assistant Examiner.*